United States Patent [19]

Nonweiler

[11] Patent Number: 4,899,295
[45] Date of Patent: Feb. 6, 1990

[54] VIDEO SIGNAL PROCESSING

[75] Inventor: Brian R. G. Nonweiler, Berkshire, Great Britain

[73] Assignee: Quantel Limited, Kenley, Great Britain

[21] Appl. No.: 52,464

[22] Filed: May 20, 1987

[30] Foreign Application Priority Data

Jun. 3, 1986 [GB] United Kingdom ............... 8613447

[51] Int. Cl.$^4$ ............................................. G06F 15/72
[52] U.S. Cl. ..................................... 364/522; 340/729; 340/747; 340/728; 340/750
[58] Field of Search ........................ 364/518, 521, 522; 340/721, 723, 747, 729, 728, 724, 750

[56] References Cited

U.S. PATENT DOCUMENTS

| | | | |
|---|---|---|---|
| 4,586,038 | 4/1986 | Sims et al. | 340/729 |
| 4,609,917 | 9/1986 | Shen | 340/729 |
| 4,682,160 | 7/1987 | Beckwith, Jr. et al. | 340/729 |
| 4,682,217 | 7/1987 | David et al. | 358/89 |
| 4,700,181 | 10/1987 | Maine et al. | 340/747 |
| 4,709,231 | 11/1987 | Sakaibara et al. | 340/729 |
| 4,727,364 | 2/1988 | Vorst | 340/729 |
| 4,737,921 | 4/1988 | Goldwasser et al. | 364/518 |

FOREIGN PATENT DOCUMENTS 0186206 12/1984 European Pat. Off. .
0198630 10/1986 European Pat. Off. .

OTHER PUBLICATIONS

Computer Vision, Graphics and Image Processing, vol. 29, No. 3, Mar. 1985, pp. 361–376, Academic Press Inc., New York, U.S.; D. Gordon et al.: "Image space shading of 3-dimensional objects", p. 361, line 2–p. 369, line 2.

Primary Examiner—David L. Clark
Attorney, Agent, or Firm—Cooper & Dunham

[57] ABSTRACT

A video signal processing system changes the shape of a video frame so that it appears to take the form of a three dimensional object. The system also applies shading to the object in response to an imaginary light source. The address data is processed to produce light intensity factors and the value of each pixel in each video frame is adjusted in response to a light intensity factor.

8 Claims, 3 Drawing Sheets

VIDEO SIGNAL PROCESSING

BACKGROUND OF THE INVENTION

The present invention relates to a video signal processing system for changing the shape of a video image so that a video frame appears to take the form of a three dimensional object. Systems of this type are disclosed in United Kingdom Patent Application Nos. 2119594A and 2158671A assigned to the assignee of the present application. These systems receive video signals, at video rate, representing sequences of images which are manipulated to produce images of a different shape to the input image. The type of processing used to produce this manipulation is called write side interpolation in which incoming picture point signals are written into addresses in a framestore, determined by the shape of the final image, and read out in normal raster format. The write addresses are pre-calculated and provide a coarse map of addresses for, say, every fourth pixel in every fourth line of every fourth field. These coarse maps can themselves be manipulated to produce a change in position or orientation in space.

As input video signals are received by the system the coarse maps are interpolated to provide the intervening addresses. In practice the write addresses do not generally fall on framestore addresses so one incoming picture point signal makes contributions to the nearest framestore addresses to the write address provided. The video signals are also interpolated and written into the desired addresses. When the contents of the frame store are read out in normal raster format the video images appear at video rate as before but the shape of the image has been changed.

Although the shape manipulation of this system is effective there is no allowance for shading from different light sources and some details of the shape may be lost particularly where there is a lot of detail in the video. It is therefore an object of the present invention to provide a system for providing shape manipulation which is capable of producing the effect of light shading on manipulated image shapes.

SUMMARY OF THE INVENTION

According to the present invention there is provided a video signal processing system for changing the shape of a video image so that a video frame appears to take the form of a three dimensional object, comprising:

(a) an address storage device for storing an address map defining the shape of said three dimensional object, (b) a frame store, (c) means for loading pixels of an input frame into the frame store in a first sequence, (d) means for reading said pixels out of said frame store in a second sequence wherein the relationship between said first sequence and said second sequence is determined from the address map, (e) a processing device for processing the address data in combination with an indication of the position of an imaginary light source to produce light intensity factors, and (f) means for adjusting the value of each pixel in the video frame in response to a light intensity factor to produce a video frame having shading due to the imaginary light source.

In a preferred embodiment the processing device includes means for calculating the angle between a vector which is perpendicular to a surface of the three dimensional object and a vector from said surface to said light source, and means for producing a light intensity factor related to said angle. The address map representing the three dimensional object may consist of a plurality of point coordinates, and the processing device may include means for calculating a light intensity factor for each surface defined by three adjacent coordinates.

Preferably the value of each pixel is adjusted in response to a light intensity factor before said pixel is loaded into the frame store.

DESCRIPTION OF THE PREFERRED EMBODIMENT

Figure 1:
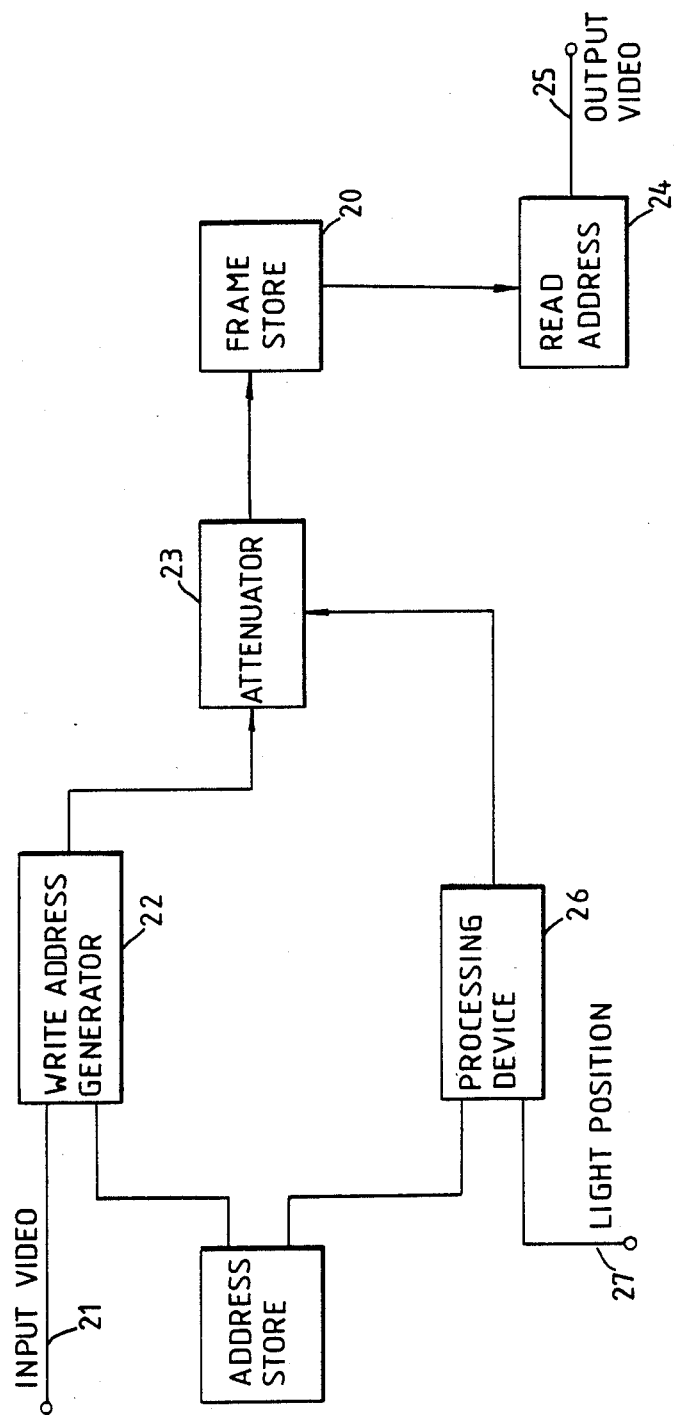
FIG. 1 shows a video processing device for manipulating the shape of a video image including a processing device for applying shading to the image.

A system for processing a video signal is shown in FIG. 1. An input video signal is manipulated so that an output image, produced on displaying an output video signal, appears to take the shape of a three dimensional object. Thus a conventional video image may, for example, be placed around a glode or a cylinder etc.

A video input signal is supplier to a frame store 20 via an input line 21, an address generator 22 and an attenuator 23. A coarse three dimensional address map is stored in address store 50 which is supplied to the write address generator 22. Generator 22 includes a spacial interpolator, a temporal interpolator, means for converting the three dimensional addresses to two dimensions and means for addressing four frame store locations for each input pixel. The system therefore performs "write side" processing as described in United Kingdom Patent Application Nos. 2119594A and 2158671A each assigned to the assignee of the present application. Pixels are read from the frame store 20 in standard raster format by a read address generator 24 to produce an output video signal on a line 25; the processing being performed in real time at the video rate.

Before being loaded into the frame store 20 each pixel is attenuated by attenuator 23 in response to light intensity factors which simulate the effect of shading on a three dimensional object. The light intensity factors are calculated by a processing device 26 in response to the coarse address map and information relating to an imaginary light source, supplied on a line 27.

Figure 2:
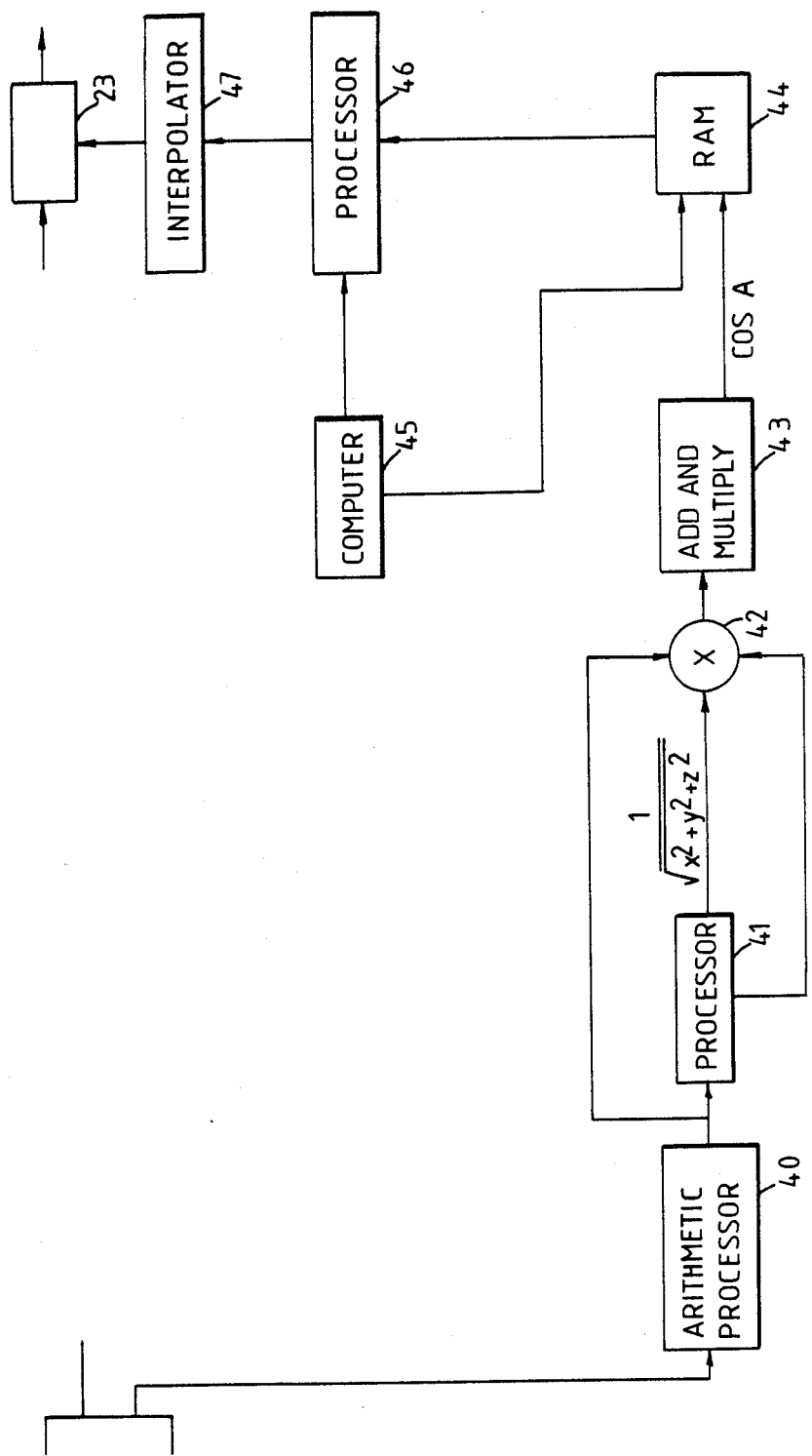
FIG. 2 details the processing device shown in FIG. 1.

The processing device 26 is shown in detail in FIG. 2. Address signals, representing a coarse map, are supplied to an arithmetic processor 40 so that groups of three signals, two from one line and one from the next, are available at the same time. These lines will of course not coincide with adjacent video lines.

Figure 3:
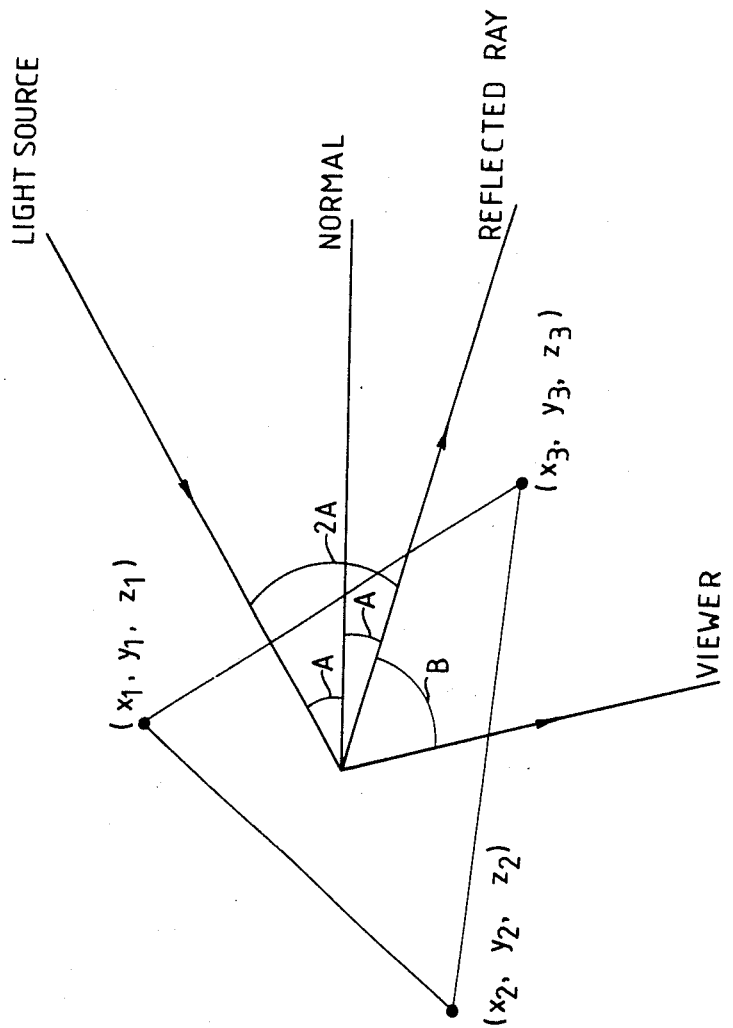
FIG. 3 illustrates the vectors involved in the calculation of the reflected light intensity.

In the model used in this embodiment the intensity of the reflected light from a surface is dependent on the angle A between a vector perpendicular (or normal) to the surface of the object and the vector from the light source to said surface (see FIG. 3). Arithmetic processor 40 therefore calculates the vector normal to the surface containing the three points $(x_1, y_1, z_1)$, $(x_2, y_2, z_2)$, $(x_3, y_3, z_3)$. This vector is defined by the cross product of the three points i.e. $XN = (x_1 x_2 - x_2 x_3)$, $YN=(y_1 z_2-y_2 y_3)$, $ZN=(z_1 z_2-z_2 z_3)$ and is calculated using multiplication and subtraction circuits in known manner. Once the coordinates nates of the normal have been calculated as above so that $N=XN\,i+YN\,j+ZN\,k$ then with the position of the light source known (the vector from the source being $S=Xs\,i+Ys\,j+Zs\,k$) it is relatively easy to calculate the cosine of the angle A. The dot product $N\cdot S=NS\cos A$ so if N and S are normalised $N\cdot S=\cos A$. After the normal vector has been calculated in arithmetic processor 40 the signals are passed to processor 41 which calculates the normalisation factors for the two vectors N and S. The normalisation factor for a vector is given by one over the square root of x squared plus y squared plus Z squared, as shown at the output of processor 41. As the numbers involved may be quite large processor 41 also performs a conversion to floating point arithmetic. The normalised vectors N and S are generated in a multiplier 42 by multiplying each component of the two vectors by the normalization factor calculated in processor 41. The final stage in determining cos. A is to form the dot product of the two vectors $N,S=xNxS+yNyS+zNzS$ where $$xN = \frac{XN}{(XN^2 + YN^2 + ZN^2)^{\frac{1}{2}}}$$

etc.

This is done in add and multiply circuit 43 which produces an output cosine for each surface. The processing of the address signals is of course continuous so that the output from circuit 43 will be the cosine A for each surface of the shape defined by the coarse map.

The reflected light intensity from a surface is given in this model by:

$$I = Ia\,Ka + \frac{Ip}{r+k}[Kd\cos A + Ks\cos^n B].$$

Where
Ia=ambient light intensity
Ka=reflection coefficient
Ip=point source intensity
r=distance from the source to the surface
Kd=diffuse reflectivity
Ks=specular reflection
B is the angle between the reflection vector and the vector from the viewer
k is a constant The $\cos^n B$ term relates to the angle between the viewer and the direction of reflected light from the surface. Calculation may be simplified if it is assumed that the position of the viewer and the light source are co-incident, in which case $B=2A$. Once the cos A is obtained in add and multiply circuit 43 it is supplied to RAM 44 which provides a look up table for arc-cos A.

Values for the term $(Kd\cos A + Ks\cos^n B)$ for different A are available in a lock up table in RAM 44 with Kd, Ks and r being independently variable and provided empirically for different values of A to give the best results in the output image. The RAM 44 may be loaded with values from a computer 45.

The first term in the equation IaKa takes into account the intensity of the ambient lighting and the reflectivity of the surface. The values for this term, and also source intensity and distance from the point source to the surface, can be chosen by the operator using the computer 45. K is a constant for all shapes. Once the term $(Kd\cos A+K_s\cos^n B)$ is available from the RAM 44 then it is supplied to processor 46 to evaluate the reflected light intensity for the chosen values for IaKa, r and Ip. In this embodiment the processor is simply a multiplier which multiplies the above term from RAM 44 (Kd cos A etc) by a factor relating to the point source intensity and the factor $1/(r+K)$. Kd and Ks are chosen so that the term from RAM 44 is between 0 and 1.

The calculated light intensities for the point in a coarse map are supplied to an interpolator 47 which interpolates these intensity factors to produce one for each point in the manipulated image. It is to be understood that the processing of the address maps to produce intensity factors is done in real time.

In this embodiment the incoming video signals are manipulated in real time to produce an output image of a different shape. The video signals can also be attenuated by amounts relating to shading of the shape due to a point light source so that the shape can be seen more easily.

It is to be understood that the calculation of the light intensity factor is not limited to the model used here. Also several point sources may be used and the effect of colored sources can also be simulated. If coloured sources are used some of the factors in the equation will be color dependent.

What I claim is:

1. A video signal processing system for changing the shape of a video image so that a video frame appears to take the form of a three-dimensional object, comprising:
   (a) an address storage device for storing an address map defining the shape of said three-dimensional object;
   (b) a frame store;
   (c) means for loading pixels of an input frame into the frame store in a first sequence;
   (d) means for reading said pixels out of said frame store in a second sequence, wherein the relationship between said first sequence and said second sequence is determined from the address map;
   (e) a processing device for processing the address data in combination with an indication of the position of an imaginary light source to produce light intensity factors; and
   (f) means for adjusting the value of each pixel in the video frame in response to a light intensity factor to produce a video frame having shading due to the imaginary light source;
   in which:
   said processing device includes means for calculating the angle between a vector which is perpendicular to a surface of the three dimensional object and a vector from said surface to said light source, and means for producing a light intensity factor related to said angle; and
   said address map representing the three dimensional object consists of a plurality of point coordinates, and the processing device includes means for calculating a light intensity factor for each surface defined by three adjacent coordinates.

2. A system according to claim 1 in which said address map does not contain a coordinate for each pixel of the video frame wherein the processing device includes means for interpolating the intensity factors to produce one for each pixel in the video.

3. A system according to claim 2 in which the value of each pixel is adjusted in response to a light intensity factor before said pixels are loaded into said frame store.

4. A video signal processing system for changing the shape of a video image so that a video frame appears to take the form of a three-dimensional object, comprising:
  (a) an address storage device for storing an address map defining the shape of said three-dimensional object;
  (b) a frame store;
  (c) means for loading pixels of an input frame into the frame store in a first sequence;
  (d) means for reading said pixels out of said frame store in a second sequence, wherein the relationship between said first sequence and said second sequence is determined from the address map;
  (e) a processing device for processing the address data in combination with an indication of the position of an imaginary light source to produce light intensity factors; and
  (f) means for adjusting the value of each pixel in the video frame in response to a light intensity factor to produce a video frame having shading due to the imaginary light source;
in which:
  a sequence of video frames making up a video signal is loaded into the frame store and read from the frame store in real time thereby effecting a shape change of a moving video image;
  said address storage device stores a plurality of related address maps; and
  the means for loading pixels of an input frame includes a temporal interpolator for calculating address maps intermediate to address maps stored in the address storage device.

5. A video signal processing system for changing the shape of a video image so that a video frame appears to take the form of a three-dimensional object, comprising:
  (a) an address storage device for storing an address map defining the shape of said three-dimensional object;
  (b) a frame store;
  (c) means for loading pixels of an input frame into the frame store in a first sequence;
  (d) means for reading said pixels out of said frame store in a second sequence, wherein the relationship between said first sequence and said second sequence is determined from the address map;
  (e) a processing device for processing the address data in combination with an indication of the position of an imaginary light source to produce light intensity factors; and
  (f) means for adjusting the value of each pixel in the video frame in response to a light intensity factor to produce a video frame having shading due to the imaginary light source;
in which:
  said processing device includes means for calculating the angle between a vector which is perpendicular to a surface of the three dimensional object and a vector from said surface to said light source, and means for producing a light intensity factor related to said angle;
  said address map representing the three dimensional object consists of a plurality of point coordinates, and the processing device includes means for calculating a light intensity factor for each surface defined by three adjacent coordinates;
  said address map does not contain a coordinate for each pixel of the video frame wherein the processing device includes means for interpolating the intensity factors to produce one for each pixel in the video; and
  the value of each pixel is adjusted in response to a light intensity factor before said pixels are loaded into said frame store.

6. A system according to claim 5 in which said address map does not contain a coordinate for each pixel of the video frame including a special interpolator for calculating intermediate pixel coordinates, and means for converting the three dimensional coordinates to two dimensional addresses for addressing the frame store.

7. A system according to claim 6 in which each pixel of an input frame makes a contribution to four adjacent storage locations in said frame store.

8. A video signal processing system comprising:
  an address store for storing at least one address map defining a three dimensional shape represented by the coordinates of pixels;
  a frame store;
  a read-in circuit for loading pixels of an input frame into the frame store in a first sequence;
  a read-out circuit for reading said pixels out of said frame store in a second sequence to form an output frame, wherein the relationship between said first sequence and said second sequence is a function of said at least one address map;
  a processor for processing said at least one address map in combination with an indication of the position of an imaginary light source to produce light intensity factors; and
  means for adjusting the value of each pixel in said output frame in response to a respective light intensity factor to produce an output video frame having shading due to said imaginary light source;
in which:
  said processing device includes means for calculating the angle between a vector which is perpendicular to a surface defined by selected pixel positions of said address may and a vector from said surface to said light source, wherein a respective one of said light intensity factors is related to said angle; and
  said at least one address map does not contain a coordinate position for each pixel of said output frame and said processor includes means for interpolating said intensity factors to produce an intensity factor for each pixel in the video, and wherein the value of each pixel of said input frame is adjusted in response to a light intensity factor before said pixels of the input frame are read into said frame store.

* * * * *